Patented Feb. 16, 1926.

1,573,400

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF MAKING ABRASIVE ARTICLES.

No Drawing.  Application filed July 13, 1923.  Serial No. 651,430.

*To all whom it may concern:*

Be it known that I, MINER L. HARTMANN, a citizen of the United States, residing at Niagara Falls, county of Niagara, and State of New York, have invented a new and useful Improvement in Methods of Making Abrasive Articles, of which the following is a full, clear, and exact description.

The present invention relates broadly to an improved method for making abrasive implements or articles in which the abrasive particles are held in rigid form by a bond, such as a vitrified ceramic bond, and to the improved mixture and article utilized and produced.

The oldest method heretofore proposed for making such structures is known as the "puddle process," and consists in mixing the abrasive grains of emery, corundum, silicon carbide, or mixture of clays and fluxes, and water, to the consistency of thick batter. This mixture is poured into suitable molds, the moisture removed by slow evaporation or absorption in porous blocks, and after thorough drying the pieces are cut to desired sizes and burned in ceramic kilns. An open porous structure is thus secured. The process, however, is slow and expensive and requires highly skilled labor.

To overcome some of the inherent difficulties of the so-called "puddle process," a process of pressing the damp mixture of abrasive grain and bond has been widely used. While this process is rapid, and less expensive than the "puddle process," the articles produced, such as grinding wheels, are too "close" or dense and the wheels do not cut freely in grinding operations. Such articles are not always satisfactory either as to uniformity or structure.

I have discovered that these inherent objections and faults of the "pressed" process of making abrasive articles may be overcome by adding to the mixture from which the articles are to be made, suitable proportions of a material which during the kiln firing of the articles is removed by volatilization and oxidation, leaving suitable voids or pore spaces in the wheel structure. For this purpose, the most available and satisfactory material is a comminuted nonmelting organic material such as wood fibre and flour. The degree of comminution of the wood depends upon the effect desired and the size of the abrasive particles being used. For the finer abrasive articles, only the finest wood flour is suitable.

The desirable results of the burning out or oxidation of the material used in the abrasive structure during the vitrifying are not limited to the production of actual voids determined by the size of the particles used. An additional advantage arises from the marked effect upon the structure of the bonding material itself, apparently due to the prevention or coalescing of the separate bond particles during the firing, and a consequent maintenance of a somewhat porous network in the bond itself.

Wood flour made from hardwood, and more particularly oak, is preferred, since during heating it does not swell nor give off excessive amounts of liquid or volatile materials, but on the other hand is quietly charred and subsequently removed by oxidation.

As an illustration of my process, I may take 80 parts by weight of an abrasive material, such as fused aluminous abrasive grains of a size corresponding to a 20 mesh screen. With this I may mix 20 parts by weight of finely divided bond consisting of 35 per cent Albany clay and 65 per cent plastic ball clay, and 2 parts of oak wood flour, all of which is 60 mesh and finer. After thorough dry mixing, this may be moistened with sufficient water to make it workable, about 4 per cent, after which it is put into suitable molds and pressed in a hydraulic press to about 1000 pounds per square inch. After removal from the mold and drying, the shapes are burned in a ceramic kiln to about cone 11. After drying and finishing the articles are then ready for use.

By the process described, I have been able to increase the porosity, in the example given, about 4 per cent over the porosity of a similar article made without the use of the wood flour. This increased porosity produces an article having much better cutting qualities. Mixtures containing the wood flour are also more easily pressed to a uniform structure than without the wood flour, thereby making possible an improvement in uniformity of finished product.

While I have described the above particular illustration of my invention, it is not my purpose to limit myself to this particular abrasive material or composition, as variations may obviously be made therein without departing from the spirit of my invention and scope of my broader claims. This method of controlling the porosity by suitable addition of non-volatile organic particles is applicable and useful in many kinds of abrasive articles in which the abrasive grains are held by a vitrified ceramic bonding agent.

Certain advantages of the present invention arise from the provision of a mixture more easily shaped and insuring greater uniformity of product.

Further advantages arise from the provision of an abrasive article or implement having improved abrasive qualities.

I claim:

1. In the process of making bonded abrasive articles, the steps consisting in adding to a raw mixture of abrasive grains and bond, comminuted non-volatile organic particles which do not have a tendency to swell up during burning, pressing the mixture to the desired shape, and subsequently effecting removal of the organic particles by burning the shaped article.

2. In the process of making bonded abrasive articles, the steps consisting in adding to a raw mixture of abrasive grains and bond, comminuated hard wood particles, pressing the mixture to the desired shape, and subsequently effecting removal of the hard wood particles.

3. In the process of making ceramically bonded abrasive articles, the steps consisting in adding to a raw mixture of fused aluminous abrasive grains and a clay bond, comminuated wood particles, pressing the mixture to the desired shape, and subsequently effecting removal of the wood particles.

4. In the process of making ceramically bonded abrasive articles, the steps consisting in adding to a raw mixture of fused aluminous abrasive grains and bond, comminuated hard wood particles, pressing the mixture to the desired shape, and subsequently effecting removal of the hard wood particles.

5. In the process of making ceramically bonded abrasive articles, the steps consisting in forming a raw mixture of abrasive grains and clay bonding material, adding thereto non-volatile organic particles, shaping the mixture, and then firing the shaped mixture to vitrify the bond and effect removal of the organic particles by volatilization and oxidation.

In testimony whereof I have hereunto set my hand.

MINER L. HARTMANN.